United States Patent Office 3,014,835
Patented Dec. 26, 1961

3,014,835
WATER-LAID INORGANIC PRODUCT
David A. Feigley, Jr., and Leonard N. Ray, Jr., Manor Township, Lancaster County, Pa., assignors to Armstrong Cork Company, Lancaster, Pa., a corporation of Pennsylvania
No Drawing. Filed Dec. 23, 1957, Ser. No. 704,325
26 Claims. (Cl. 162—154)

This invention relates generally to water-laid products and more particularly to water-laid products fabricated of inorganic water-insoluble particles. Still more particularly the invention relates in one embodiment thereof to fast-draining aqueous slurries comprising inorganic fibers and inorganic granules. The invention also relates to the products formed from these slurries and to the process of making such products.

The term "particles" as used in the present specification and claims is intended to include fibrous particles, granular particles, and mixtures thereof. Although a fiber-reinforced product is a preferred embodiment of the present invention, the invention is not limited thereto. Thus the invention contemplates the treatment of water-insoluble, inorganic fibers; water-insoluble, inorganic granules; and mixtures thereof. The inorganic fibers may be treated in accordance with the present invention in the absence of granules, or the granules may be treated in the absence of fibers. So long as the fibrous particles and the granular particles are inorganic and water-insoluble, the present invention will be operable.

Following is a simplified flow diagram of the process of the present invention:

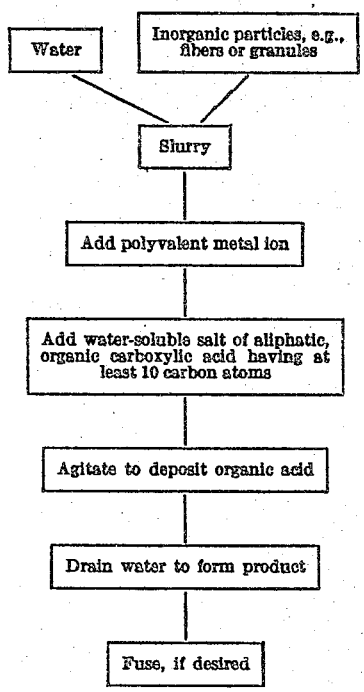

It is the primary object of the present invention to present a product and a process wherein inorganic water-insoluble particles may be taken up in water and treated in order that there may be formed a fast-draining slurry from which various shaped products may be produced. It is a further object of the present invention to present a fiber-reinforced, inorganic product which can be prepared from a fast-draining slurry on a Fourdrinier wire, cylinder machine, or a suitable mold adapted to retain the solids content of the slurry while allowing the water to drain.

These objects are accomplished in a surprisingly effective and straightforward manner. The invention contemplates forming in water a slurry of inorganic, water-insoluble particles. This slurry is then treated with a polyvalent metal ion having a charge of at least +3. Subsequent to such treatment there is added to the treated slurry a water-soluble salt of an acyclic, aliphatic, organic compound having at least 10 carbon atoms and containing at least one carboxylic acid group. This compound is added in an amount of about 0.2–20% by weight based on the dry weight of the particles. The resulting fast-draining slurry may then be used to form a product by draining the water therefrom.

The material contemplated for treatment in accordance with the present invention is inorganic particles which may comprise a mixture of water-insoluble inorganic fibers and water-insoluble inorganic granules. When a mixture is used the amount of fibers present in the mixture will generally be in the range of about 10–90% by weight of the fibers-granules mixture. Within this range the amounts of fibers will vary according to the particular product desired.

Any type of water-insoluble inorganic particles may be used. When the particles are fibers the invention contemplates asbestos fibers such as chrysotile, crocidolite, amosite, and tremolite, in addition to anthophyllite, actinolite, and ossanite. Various glass fibers may be used such as the fibers prepared from bottle glass, window glass, borosilicate glass, and other kinds of temperature-resistant glass. Quartz fibers are suitable as are those in mineral wool. Additionally there may be used fibers of carbon such as those prepared by careful ignition of certain organic fibers. Aluminum silicate fibers, generally sold as "Fiberfrax," the so-called potassium titanate fibers, and brucite, have all been shown to be operable in the present invention. The only limitation on the fibers useful in the present invention is that the fibers must be water-insoluble and inorganic. The length of the fibers is not critical. It is preferred that the fibers be sufficiently short that they do not ball up on agitators or otherwise interfere with processing equipment such as pumps and the like. Fibers as long as an inch or longer may be used so long as they do not cause mechanical difficulties. There is no minimum length to the fibers so long as one axis of the material has a length substantially greater than that of the other axis; usually a ratio of about 10:1 and up will define the fiber. This is to say merely that the fibers may be quite short but that they still should be sufficiently long to be classed as fibers.

The water-insoluble inorganic granules contemplated for use in the present invention include a wide variety of materials. Various clays may be used. Clay is a natural earthy material resulting from decomposition of felspathic rocks and consisting essentially of kaolinite, a hydrous aluminum silicate generally mixed with powdered felspar, quartz, sand, iron, oxide, and various other minerals. These alumino-silicates resulting from the weathering of rock are in a more or less colloidal condition. The various china clays, otherwise called kaolin; diatomaceous earth; fuller's earth; the Mississippi clays; bentonite; and others; are all suitable in the present invention. The montmorillonite clays are usable. Since hydraulic cement is a fired mixture of clay and limestone, hydraulic cement is included in the scope of the term "water-insoluble inorganic granules." Limestone is operable as is silica or sand. The insoluble hydroxides, oxides, carbonates, sulphides, of polyvalent metals such as alkaline earth metals, rare earth metals, heavy metals, including the transition elements, are all suitable. The oxides of zinc and magnesium and iron are all operable. Additionally the inorganic granules may comprise the same material as the above-described fibers so long as the fibers have been chopped up or shortened sufficiently to lose their identity as fibers and to assume the identity of granules. For example, the fibers may comprise asbestos fibers, and the granules may comprise asbestos fibers which have been chopped into granules wherein one axis is not substantially longer than the other. The important characteristic of the granules is that they be water-insoluble and inorganic. Materials such as calcium carbonate possess sufficiently slight solubility in water to be classed as water-insoluble for the purposes of the present invention.

The size of the granules to be used in the present invention is not critical so long as the size is sufficiently small that the granules will remain in aqueous suspension with the agitation normally encountered in papermaking beaters and chests. As a general rule the particles to be used will be of a size that at least about 90% of the particles will pass through a 200-mesh screen. To state it another way, the granules will be smaller than about 100 microns. Frequently granules much finer than this will be used. Many factors will control the precise size of the granules. Illustrative of such factors are the type of product desired, that is a sheet or other shaped product, the desired rate of drainage of the slurry, the availability and cost of the different sizes of one particular kind of granule, and other considerations.

The forming of the slurry of inorganic particles is accomplished by methods known in the art. The fibers or the granules or both are taken up in water generally to a consistency in the range of about 0.5–5%. If a sheet such as a paper or a felt is to be formed from fibers, then the slurry will be subjected to mechanical refining. In such a case it is preferable that the fibers be refined prior to the addition of any granules to the slurry. It will often be the case that the granules, particularly where the clays are to be used, are already in a sufficiently fine condition that mechanical refining is unnecessary. Accordingly, where a paper or a felt is to be prepared by the present invention, it is preferred to form the slurry of fibers in water, refine the fibers, and then add any inorganic granules before proceeding to the further steps of the present invention. Mechanical refining will do no harm to the inorganic granules, however; and the granules may be refined along with the fibers if the economics of the particular situation justifies such a step.

It is apparent that it is not critical as to whether the fibers or the granules be added to the water first in order to form the slurry. Both may be added at the same time if so desired.

Once the slurry comprising fibers or granules or both has been formed, refined if desired, and adjusted preferably to a consistency in the range of about 0.5–5% as described above, the slurry is in condition for further treatment in accordance with the present invention.

The fibers or granules or mixtures thereof are to be treated with a polyvalent metal ion bearing an ionic charge of at least +3. This step is most conveniently accomplished simply by adding to the slurry a salt of a metal, which metal is in a valence state of +3 or greater. Aluminum ion bearing a charge of +3 is the preferred ion and is most conveniently added in the form of a water solution of papermaker's alum, $Al_2(SO_4)_3 18H_2O$. Examples of polyvalent metal ions useful in the present invention which can carry a charge of +3 or more are aluminum, arsenic, bismuth, chromium, iron, germanium, manganese, molybdenum, antimony, tin, titanium, vanadium, tungsten, and zirconium. Many of the precious metals are operable along with some of the rare earth metals and metals which are currently scarce; these need not be specifically named here. The polyvalent metals in the proper ionic state are utilized in the form of their salts such as the nitrate, the chloride, the sulphate, or other form which will release the charged ion into the water. Although the polyvalent metal salt may be added directly to the slurry as such, it is preferred to add it in the form of a water solution. Such addition greatly enhances the distribution of the charged ions throughout the slurry and enhances the speed with which the total process may be completed.

The minimum amount of polyvalent metal ion needed to treat the particles in suspension is extraordinarily small. Usually about 0.1% by weight calculated as the metallic ion and based on the weight of the dry particles is sufficient to render the particles amenable to subsequent reaction with the organic compound. A good working rule is to add the salt of the polyvalent metal ion in an amount of about 2–6% by weight based on the total dry weight of the particles being treated. This amount of the salt will always supply sufficient polyvalent metal ion to render the particles amenable to subsequent treatment. Hence if 100 pounds of particles are to be treated, at least two pounds of the salt will always suffice. A practical upper limit is 10% by weight of the salt based on the weight of the particles; this amount will be needed to subsequently react as much as 20% by weight of the organic compound with the particles. Amounts of the salt above the stated 10% will cause precipitation in the white water of the organic compound to be added subsequently. Thus the practical limits are in the range of about 2–10% by weight of the metal salt based on the dry weight of the particles, with the preferred amount being 2–6%. Within these ranges increasing amounts of metallic salt allow reaction of the particles with increasing amounts of organic compound.

Although only small amounts are needed, the criticality of those small amounts must be emphasized. If the polyvalent metal salt is not added to the slurry, subsequent treatment with the organic compound generally produces not the slightest effect on the drainage rate of the slurry. Such a result is completely unobvious. Although the reason for such behavior is not known, it is postulated that the appreciable positive charge carried on the polyvalent metal ion reduces or reverses the normally negative charge on the particles in an aqueous suspension and thus allows reaction of the treated particles with the organic compound to be added subsequently. Those few fibers and granules which bear positive charges are rendered more positive by the metallic salt treatment. In effect the salt treatment eliminates the differences in various fibers and granules and renders them all amenable to subsequent identical treatment with the organic compound.

Once the particles have been treated with the polyvalent metal ion, preferably with gentle agitation, the slurry is ready for the addition of a certain class of organic compounds.

These compounds may generally be defined as acyclic, aliphatic, water-soluble salts of organic carboxylic acids. As a further limitation the compounds must contain at least 10 carbon atoms in the carbon chain of the acid. The compounds must contain at least 10 carbon atoms in the chain since, as will be shown, if the carboxylic acid chain contains less than 10 carbon atoms, the compound will not substantially improve the drainage rate of the slurry.

The compounds to be added are water-soluble salts of organic carboxylic acids of at least 10 carbon atoms. More than one carboxylic acid group may be present on the molecule. The compounds may be di-, tri-, or tetra-carboxylic acids so long as they contain at least 10 carbon atoms. Aromatic organic carboxylic acids are inoperable; the acids must be aliphatic. However, the aliphatic chain may be aromatic-substituted, as in phenyl stearic acid. The carbon chain in the compound may possess other reactive groups, including unsaturated carbon-to-carbon bonds.

Water-soluble organic acid salts having large numbers of carbon atoms are especially suitable in the present invention. Such acids are best illustrated by the dimerized and trimerized fatty acids which are readily available in commerce. These acids are prepared by the thermal polymerization of drying oil acids carried out in a pressure vessel in the presence of water in the form of steam. The resulting compositions generally contain on the average about 3% monomer, 75% dimer, and 22% trimer. Such a product is known as dimerized fatty acids and will have an iodine value of approximately 90 and an acid number of approximately 190; it will normally possess residual olefinic unsaturation. The dimerized acid itself is essentially a 36-carbon dicarboxylic acid obtained by dimerization of the linoleic acid of soya, cottonseed, corn, and linseed oils of commerce. The product is frequently referred to as dilinoleic acid. This dimerized acid may be purchased under the name "Empol 1022." It is apparent that the dimerized acids and the trimerized acids resulting from the above-described pressurized process may be separated or further concentrated as desired. Thus, the trimer acid may be purchased as such. The trimer acid is a 54-carbon acid and contains a plurality of carboxylic acid groups. As a further variation on the dimer and trimer acids, any residual olefinic unsaturation in the carbon chain may be eliminated by hydrogenation. The hydrogenated dimer acid may be purchased under the name "Emery 3020-S"; the predominantly straight trimer acid may be purchased under the name "Emery 3055-S." These polymerized fatty acids described above are preeminently suitable in the present invention and constitute a preferred embodiment thereof, particularly in unsaturated form.

The organic acids in wood rosin are not operable in the present invention. Wood rosin contains as its primary ingredient abietic acid. The next most common organic acid in wood rosin is neoabietic acid. Smaller amounts of dihydroabietic acid, tetrahydroabietic acid, and d-pimaric acid are present, along with a minor amount of dehydroabietic acid. All of these are cyclic organic acids and are excluded from the scope of the present invention by use of the term "acyclic."

Many commercially available fatty acids and fatty acid soaps meet the earlier described definition of those compounds which control the drainage characteristics of the particles. These soaps may be in solid or liquid form. As a general rule, liquid soaps are characteristic of the unsaturated higher fatty acids, and solid soaps are characteristic of the saturated higher fatty acids. As an example of such acids, there may be given "Neo-Fat 4212" which is a liquid and is a fatty acid mixture of 46% by weight oleic acid, 39% linoleic acid, 3% linolenic acid, the balance being a natural resin. As an example of the soaps, there is "P & G Soap" which is a mixture of the sodium soaps of stearic, oleic, and palmitic acids; this is a solid soap.

A further class of compounds useful in controlling the drainage characteristics of the particles are the maleic acid or maleic anhydride adducts (Diels-Alder reaction) of any of the unsaturated acids described above as, for example, linoleic acid, oleic acid, and dilinoleic acid.

It will be appreciated that all of the above-described compounds meet the stated definition of acyclic, aliphatic, organic compounds having at least 10 carbon atoms, said compound containing at least one carboxylic acid salt group.

The compounds useful in the present invention must be converted to their water-soluble form. In view of the size of most of the molecules, the compounds are not generally per se soluble. They are, however, easily rendered soluble by reaction with an alkaline material such as ammonia, sodium hydroxide, potassium hydroxide, carbonates of ammonia, sodium, and potassium, and even to some extent with alkaline earth metal compounds and organic amines. It must be emphasized that the compounds used in the present invention need not be very soluble to be operable. They are used in amounts much less than 0.1% by weight of the water, so easy solubility is not necessary. In the present specification and claims, it is contemplated that the defined organic carboxylic acids are rendered water-soluble where necessary by reaction of the acid with a solubilizing alkaline ingredient to form a salt. Thus, the compound to be used will be selected from the group consisting of water-soluble acids, water-soluble acid salts, and mixtures thereof.

The actual step of adding the organic acid salt to the aqueous slurry containing the fibers or granules or mixtures thereof is readily accomplished by simply physically adding the salt to the slurry. As in the case of the polyvalent metal ion, however, the salt will preferably first be taken up in water to form an aqueous solution or suspension and the organic salt will then be added in the form of that solution or suspension. Use of a solution aids in quick dispersion of the water-soluble acid throughout the slurry and hastens the reaction that takes place between the organic acid and the surface of the particles.

The amount of organic acid to be used in the present invention is critical within a certain range. It has been found that the addition of amounts of the organic acid greater than about 20% by weight based on the dry weight of the particles causes a reversal of the dramatic improvement in drainage rate which is the essence of the present invention. Hence, as a practical matter, the amount of acid to be used—no matter what particular acid—will always be less than about 20% by weight based on the dry weight of the particles. The precise amount less than this practical maximum will be determined to some extent by the particular organic acid salt used. Relative hardness of the water can cause some variation in the amount, as can the amount of polyvalent metal salt previously added. As described earlier, those organic acid salts within the definition of those which control the drainage characteristics of the particles and which possess more than one carboxylic acid group on very long carbon chains have a more pronounced effect for the purpose intended than the monocarboxylic acid salts. Within these two extremes varying degrees of activity will be encountered, depending on the precise number of carboxylic acid groups. The minimum amount of the salts to be added will run about 0.2% by weight based on the dry weight of the particles; this is the amount at which the improved drainage rate becomes consistently noticeable. The preferred amount of the organic salt will generally be in the range of 3–8% by weight acid based on the dry weight of the particles. Amounts near the upper limit of 20% will not be used often save with such particles as magnesium hydroxide granules which call for larger amounts of the organic compound in order to achieve the dramatic improvement in drainage rate obtained by the present invention.

Once the organic acid has been added in the desired amount to the aqueous slurry containing the particles, agitation will be carried out for a sufficient length of time to disperse the acid thoroughly throughout the slurry. This time generally runs about one to ten minutes. The temperature of the water, efficiency of agitation, consistency of the slurry, and like factors will control the agitation time. As stated earlier the water-soluble organic salt reacts with the surface of the particles, and since the reaction is fairly rapid, agitation need not be prolonged. This will be particularly true where the organic acid is added in the form of a water solution so that no time need be wasted waiting for the acid to dissolve in the water of the slurry. After the reaction of the organic acid with the surface of the particles, the slurry is formed into a product. If the product is to be sheets of paper or felt or board, then there will be used standard papermaking equipment as, for example, a Fourdrinier wire or cylinder machine. For shaped products there will be used a mold adapted to retain the particles while allowing the water to run out.

Sheets of paper prepared as described above with fibers and granules possess a kind of built-in filler. If a thicker gauge is used so as to prepare a felt, such felt can be used as a vibration-damping felt having fireproof properties; such products are useful in the airplane industry inside engine cowlings and as a lining in various other compartments. Boards prepared as described above are useful as building panels. If the finished slurry is poured into a mold adapted to retain the solids while allowing the water to drain, a wide variety of shapes may be achieved. Ceramic insulators reinforced with the fibers are thus possible. The drainage characteristics of the slurry are such that the formed object may be handled for further treatment. This is to be contrasted with slurries untreated by the present invention wherein the resulting wet product—besides consuming an undue amount of time for drainage—is so soft and friable as to be handled only with the greatest of difficulty. Products made by the present invention are readily dried in an air-circulating oven or other suitable drier. Additionally, a true ceramic product may be prepared by firing the products produced by the present invention, preferably at the usual temperature of between about 1,000°–1,300° C. If desired, a glaze may be placed on the fired surface by spreading a slip over the surface and refiring, preferably at the usual temperatures of about 900°–1,000° C. By these processes temperature-resistant ceramic bodies suitable for use as insulators, liners, and a variety of other uses are easily prepared.

It must be emphasized that the ready ease of formation of these products all results from the dramatic improvement in drainage time of the slurry brought about by pretreatment of the particles with a polyvalent metal ion and subsequent treatment with an organic acid salt as has been described. Where papers and felts are to be prepared, it is apparent that the usual sizing agents, such as starch, casein, cellulosic gums, may be used in conjunction with the sheetmaking processes described herein. Sizing and other processing variables may be carried out after the particles have been treated and before the treated slurry is passed to the paper-forming wire, or once the sheet has been formed on the wire. For certain purposes it may be desirable to precipitate synthetic rubber binder onto the particles in order to strengthen the product further. Small amounts, generally 1–5% by weight rubber based on the weight of the particles will usually suffice for this purpose, although appreciably larger amounts can be used if desired. Mere addition of the latex to the treated slurry followed by agitation will cause precipitation of this small amount of rubber onto the particles. Where larger amounts of rubber are to be added, addition of a precipitating agent such as a solution of papermaker's alum will speed and complete the precipitation. The synthetic rubber latices which can be used as additional binder if desired are those normally used in beater saturation processes and include butadiene-styrene copolymers, butadiene-arcylonitrile copolymers, polychloroprene, and the like.

The following examples illustrate several embodiments of the invention. All parts are by weight unless otherwise stated.

Example 1

Into 4,000 parts of water was placed 40 parts chrysotile asbestos fibers (5D), and the mixture was beaten for 15 minutes in a laboratory beater. Subsequently 40 parts of diatomaceous earth was added with gentle agitation. When this slurry was placed in a laboratory mold measuring 12" x 12", the drainage time was greater than 400 seconds.

A slurry as prepared above was treated with 6 parts papermaker's alum ($Al_2(SO_4)_3 \cdot 18H_2O$) dissolved in 100 parts of water. The drainage rate of this alum-treated slurry was still greater than 400 seconds.

To a slurry prepared exactly as illustrated above and treated with alum as described immediately above there was added 80 parts of a 16.1% solution of dimer acid soap. The soap solution was prepared by taking up hydrogenated dimerized acid (Emery 3020-S) in water and adding sufficient potassium hydroxide to form a solution. After the 80 parts of the 16.1% solution of dimerized acid soap had been added, gentle agitation was carried out for 5 minutes. The resulting slurry drained in the laboratory 12" x 12" mold in 17 seconds, forming a strong and sturdy wet sheet as contrasted with the weak and fluffy wet sheets produced from the above-described slurries which were not treated with the soap solution.

The sheet produced by use of the soap solution was air dried in a circulating oven maintained at 195° F. A strong fiber-reinforced clay sheet resulted.

Example 2

A soap-treated sheet was prepared as in Example 1 save that, instead of the alum solution, there was added a solution of stannic chloride ($SnCl_4 \cdot 5H_2O$). The tin salt was added in the form of a solution made by dissolving 4½ parts of the salt in 100 parts of water. The resulting sheet drained in 6 seconds. The dried sheet was strong and sturdy.

Example 3

Example 2 was repeated except that in place of the stannic chloride solution there was used a ferric chloride solution prepared by dissolving 4½ parts of ferric chloride ($FeCl_3 \cdot 6H_2O$) in 10 parts of water. The resulting sheet drained in 6 seconds in the laboratory mold and produced on drying a sturdy panel.

Example 4

Into 4,000 parts of water was placed 40 parts chrysotile asbestos fibers (5D) and the slurry was beaten for 15 minutes. There was then added 40 parts Portland cement followed by 3 parts papermaker's alum dissolved in 100 parts water. There was then added 80 parts of the 16.1% soap solution used in Example 1. Drainage time of the resultant sheet in the laboratory mold was 20 seconds. The wet product was strong enough to be handled alone. It was placed in a sealed polyethylene bag and allowed to cure therein for a period of 1 month. A strong dense asbestos-cement board resulted.

Example 5

The soap-treated sheet described in Example 1 was prepared as in Example 1 except that 40 parts of a kaolin was substituted for the 40 parts of diatomaceous earth. A strong sheet product resulted.

Example 6

A series of slurries is made each containing 40 parts chrysotile asbestos fibers and 40 parts of a kaolin clay in 4,000 parts of water. Each is treated with a solution containing 6 parts papermaker's alum. Subsequently, each treated slurry is reacted with the amount of organic salt listed in the table immediately below. The drainage time in the laboratory 12" x 12" sheet mold is shown in the table.

| Run No. | Organic Acid | Amount of Organic Acid Salt, Parts | Drain Time in Seconds |
|---|---|---|---|
| 1 | None | None | >400 |
| 2 | Neo-Fat 4212 | 16 | 90 |
| 3 | P&G Soap | 10.6 | 200 |
| 4 | FF Rosin | 16 | >400 |
| 5 | FF Rosin | 8 | 390 |
| 6 | Stearic Acid | 16 | 100 |
| 7 | Myristic Acid | 16 | 240 |
| 8 | Decanoic Acid | 16 | 310 |
| 9 | Octanoic Acid | 16 | >400 |
| 10 | Empol 1022 (dimer acid) | 16 | 20 |
| 11 | Brassidic Acid | 16 | 140 |
| 12 | Emery 3055-S (trimer acid) | 8 | 20 |
| 13 | Phenyl Stearic Acid (mixture of 9- and 10-substituted) | 16 | 30 |

Neo-Fat 4212 is a mixture of oleic acid, 46%; linoleic acid, 39%; linolenic acid, 3%; and a resin, 12%. P & G Soap is a mixture of the sodium salts of stearic, oleic, and palmitic acids; it was added as such in water solution. In all runs except run 3 the water-soluble organic acid solution is prepared by dissolving 100 parts of the acid, 25.5 parts KOH, in 495.5 parts water. Sufficient of this solution is used to give the amount of organic acids shown in the above table.

It can be seen that run 9 which used octanoic acid, an 8-carbon acid, gives no improvement over the control which uses nothing. However, run 8, which uses decanoic acid, a 10-carbon acid, produces better than a 20% decrease in drainage time.

*Example 7*

Into 4,000 parts of water was placed 40 parts crocidolite asbestos fiber, and the mixture was beaten for 15 minutes in a laboratory beater. Subsequently 40 parts of Portland cement was added with gentle agitation. When this slurry was placed in a laboratory mold measuring 12" x 12", the drainage time was greater than 400 seconds. When the slurry was treated with 6 parts papermaker's alum dissolved in 100 parts of water, the drainage rate was still greater than 400 seconds.

To a slurry prepared exactly as described above and further treated with alum as described above there was added 80 parts of a 16.1% solution of dimer acid soap. The resulting slurry drained in the laboratory 12" x 12" mold in 20 seconds, forming a strong, wet sheet.

*Example 8*

A series of slurries is made up containing the fibers and the particles described in the table below. Each slurry contained 4,000 parts water, 40 parts fibers, and 40 parts particles. Each slurry was treated with 6 parts papermaker's alum dissolved in 100 parts of water, followed by a treatment with 80 parts of a 16.1% solution of dimer acid soap; the soap solution was prepared as described in Example 1. Following are the results:

| Run No. | Inorganic Fibers | Inorganic Particles | Drain Time in Seconds |
|---|---|---|---|
| 14 | Glass, Bottle | Zinc Oxide | 32 |
| 15 | Glass, Borosilicate | Silicon Dioxide | 28 |
| 16 | Aluminum Silicate (Fiberfrax) | Magnesium Oxide | 33 |
| 17 | Mineral Wool | Portland Cement | 40 |

Run 17, using mineral wool, was agitated very gently in order that the brittle mineral wool fibers would not be broken up.

All of the water-insoluble inorganic particles were sized sufficiently that at least 90% passed through a 200-mesh screen. In runs 14 and 16, the two oxides are sufficiently fine that 100% passes through the 200-mesh screen. In run 17, utilizing Portland cement, two or three small balls of cement were all that were retained on the 200-mesh screen.

*Example 9*

A sheet was prepared as usual with the following ingredients:

| Ingredients | Parts |
|---|---|
| Water | 4,000 |
| Clay (Suprex Clay) | 40 |
| Papermaker's Alum (as water solution) | 3 |
| Dimer acid solution, 16.1% | 40 |

The sheet drained in the mold in 100 seconds. An identical sheet save for the absence of the dimer acid drained in well over 400 seconds.

*Example 10*

A slurry containing 40 parts crocidolite asbestos fibers in 4,000 parts of water was refined for 15 minutes in a laboratory beater. The resulting slurry had a Canadian freeness of substantially zero and required 195 seconds to drain in a 12" x 12" laboratory sheet mold. The resulting sheet was so weak that it could not be wet pressed and dried.

A second slurry was prepared and refined exactly as described above. A 10% solution containing one part (dry weight) of papermaker's alum was added to the slurry with agitation. Exactly 9.4 parts of the soap solution (1.5 parts acid on a dry basis) of Example 1 was added to the alum-treated crocidolite slurry with agitation. The resulting slurry had a Canadian freeness of 400 cc. and drained in the 12" x 12" laboratory sheet mold in 42 seconds. The resulting sheet could be wet pressed and dried in the normal way. The dried sheet product had a density of 23 pounds per cubic foot.

*Example 11*

Into 21,300 parts of water was placed 320 parts chrysotile asbestos fiber and the slurry was refined for 10 minutes in a beater. There was then added with gentle agitation 320 parts of a clay (Suprex Clay) followed by 48 parts of papermaker's alum in a water solution. Finally there was added with gentle agitation 640 parts of the 16.1% solution of dimer acid described in Example 1.

The slurry drained swiftly and formed a strong, handleable wet sheet which, on drying at 195° F., possessed a density of 50 lbs./ft.$^3$. The dry sheet was then fired for 4 hours at 2,240° F. (1,223° C.) to produce a fused, strong, hard, ceramic sheet having a density of 90 lbs./ft.$^3$.

We claim:

1. The process of making a water-laid product which comprises forming with water a slurry of water-insoluble, inorganic particles, treating said particles by adding to said slurry a salt containing a polyvalent metal ion having a charge of at least +3, adding to said treated slurry an additive consisting essentially of a water-soluble salt of an acyclic, aliphatic, organic compound having at least 10 carbon atoms and containing at least one carboxylic acid group in an amount of about 0.2–20% by weight based on the dry weight of said particles, agitating the mixture of said slurry and said compound to cause said compound to react with the surfaces of said particles, and forming a water-laid product from the resulting slurry by draining the water therefrom.

2. A process according to claim 1 wherein said particles comprise water-insoluble, inorganic fibers.

3. A process according to claim 1 wherein said particles comprise water-insoluble, inorganic granules.

4. A process according to claim 1 wherein said particles comprise a mixture of about 10–90% by weight fibers and 90–10% by weight granules based on the total weight of said particles.

5. A process according to claim 1 wherein said polyvalent metal ion comprises trivalent aluminum.

6. A process according to claim 1 wherein said particles comprise a mixture of about 10–90% by weight asbestos fibers and about 90–10% by weight clay.

7. A process according to claim 1 wherein said particles comprise a mixture of about 10–90% by weight asbestos fibers and about 90–10% by weight zinc oxide.

8. A process according to claim 1 wherein said particles comprise asbestos fibers.

9. A process according to claim 1 wherein said particles comprise a mixture containing about 10–90% by weight asbestos and about 90–10% by weight hydraulic cement.

10. A process according to claim 1 wherein said organic compound comprises a polycarboxylic acid.

11. A process according to claim 1 wherein said organic compound is an olefinically unsaturated compound.

12. A process according to claim 1 wherein said organic compound comprises a saturated organic compound.

13. A process according to claim 1 wherein said particles comprise a mixture of about 10–90% by weight asbestos fibers, about 90–10% by weight hydraulic cement, said metallic ion comprises trivalent aluminum, and said organic compound comprises a polycarboxylic acid salt.

14. A water-laid product comprising water-insoluble, inorganic fibers and water-insoluble, inorganic granules, the surface of said fibers and said granules being reacted with about 0.2–20% by weight based on the dry weight of said fibers and said granules with a salt of an acyclic, aliphatic, organic compound having at least 10 carbon atoms and containing at least one carboxylic acid group.

15. A product according to claim 14 wherein said fibers comprise asbestos fibers.

16. A product according to claim 14 wherein said fibers comprise asbestos fibers and said granules comprise a clay.

17. A product according to claim 14 wherein said fibers comprise asbestos and said granules comprise a metallic oxide.

18. A product according to claim 17 wherein said metallic oxide comprises zinc oxide.

19. A product according to claim 14 wherein said fibers comprise glass fibers.

20. A product according to claim 14 wherein said organic compound comprises a polycarboxylic acid.

21. A product according to claim 20 wherein said polycarboxylic acid is olefinically unsaturated.

22. A product according to claim 14 wherein said organic compound is olefinically unsaturated.

23. A product according to claim 14 wherein said compound is saturated.

24. A product according to claim 14 wherein said fibers comprise asbestos, said granules comprise a clay, and said organic compound comprises a polycarboxylic acid.

25. A product according to claim 14 containing about 10–90% by weight of said fibers and about 90–10% by weight of said granules based on the dry weight of the mixture of said fibers and granules.

26. The fused and fired product of claim 14.

References Cited in the file of this patent

UNITED STATES PATENTS

| | | |
|---|---|---|
| 2,068,219 | Badollet | Jan. 19, 1937 |
| 2,284,241 | Werntz | May 26, 1942 |
| 2,447,064 | Gebhart et al. | Aug. 17, 1948 |
| 2,588,200 | Bley | Mar. 4, 1952 |
| 2,611,718 | Steinman | Sept. 23, 1952 |
| 2,626,213 | Novak | Jan. 20, 1953 |
| 2,661,287 | Barbaras | Dec. 1, 1953 |
| 2,769,713 | Wilson | Nov. 6, 1956 |
| 2,772,970 | Feigley | Dec. 4, 1956 |
| 2,910,399 | Jordan | Oct. 27, 1959 |
| 2,930,106 | Wrotnowski | Mar. 29, 1960 |
| 2,940,892 | Feigley et al. | June 14, 1960 |

FOREIGN PATENTS

| | | |
|---|---|---|
| 559,951 | Canada | July 8, 1958 |
| 517,638 | Great Britain | Feb. 5, 1940 |
| 575,479 | Great Britain | Feb. 20, 1946 |